Oct. 27, 1925.  1,559,412
J. R. FRANZEN
METHOD OF PRODUCING CHOCOLATE COATED CONFECTIONS
Filed Nov. 13, 1924
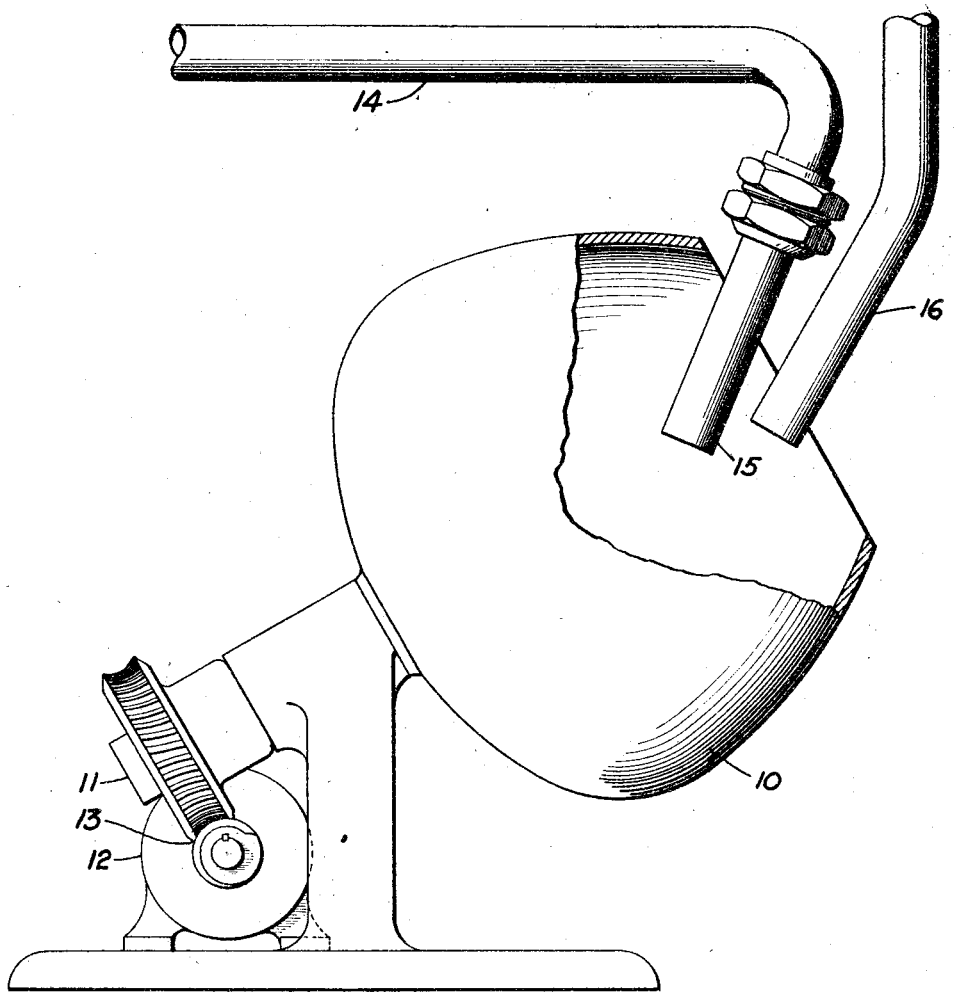
Inventor.
Julius R. Franzen.
By Davey, Strong,
Townsend and Loftus
Attorneys.

Patented Oct. 27, 1925.

1,559,412

UNITED STATES PATENT OFFICE.

JULIUS R. FRANZEN, OF SAN FRANCISCO, CALIFORNIA, ASSIGNOR TO ERNEST WILSON, OF PALO ALTO, CALIFORNIA.

METHOD OF PRODUCING CHOCOLATE-COATED CONFECTIONS.

Application filed November 13, 1924. Serial No. 749,582.

*To all whom it may concern:*

Be it known that I, JULIUS R. FRANZEN, a citizen of the United States, residing in the city and county of San Francisco and State of California, have invented new and useful Improvements in Methods of Producing Chocolate-Coated Confections, of which the following is a specification.

This invention relates to the coating of edibles with chocolate, and is a substitution for and continuation in part of my application, Serial Number 689,164, filed January 28, 1924.

Prior to my invention, chocolate coating could not be successfully applied by means of revolving pans known in the trade as "Dragee machines", owing to the fact that the chocolate acted to form a more or less solid mass, and caused the centers or nuclei to stick together. The usual practice, therefore, was to dip the centers or nuclei by hand, which is a slow and expensive process, or to coat them with an enrobing machine, which latter is a rather expensive mechanism, and requires a large investment.

In and by the present invention I am enabled to successfully apply chocolate coating to edible centers or nuclei, using a revolving pan or "Dragee machine" and therefore enabling the production to be carried out in large quantities and at small cost.

Numerous experiments have been made to successfully coat confections with chocolate in a revolving pan. One such attempt contemplates the introduction of a powdered substance at frequent intervals while the mass is being tumbled, to keep the objects separated. Such a method can be applied successfully to the coating of pills with material other than chocolate, or to apply an adulterated chocolate coating to candies; but it can not be used to produce a pure chocolate coating, unless proper regard be paid to temperature conditions, since if a pure powdered chocolate, containing cocoa butter, be used, the powdered chocolate under high temperature quickly melts, owing to the presence of the fat therein, and simply aggravates the condition sought to be remedied, namely, to prevent the coated particles from sticking together and to prevent the mass from sticking to the pan.

My experiments have shown that there is a definite relationship between the rate of applying the melted chocolate and the rate of cooling, which seems to have been generally overlooked. If the volume of melted chocolate applied to the centers or nuclei in the revolving vessel be out of proportion to the rate of hardening, there will accumulate in the vessel a sticky mass of such strength as to bind the centers or nuclei together. However, if the application of the melted chocolate be relatively slow and gradual, and the rate of hardening be properly proportioned therewith, as by artificial cooling of the contents of the vessel, the centers will acquire a proper coating of chocolate without danger of sticking together; that is to say, the adhesiveness of the chocolate becomes less in direct proportion to the decrease in temperature. Conditions of humidity also enter in, as will be pointed out hereinafter.

My invention may be carried out with a variety of different forms of apparatus, and in the accompanying drawing I show merely for the purpose of illustration a revolving pan or vessel of the Dragee type, fitted with suitable air pipes for practising my invention.

Referring in detail to the apparatus shown in the accompanying drawing, it comprises a pan 10 supported on an inclined shaft 11, which latter is slowly rotated by a motor 12 through suitable worm gearing 13.

As a means of accelerating cooling of the contents of the revolving pan or vessel, I show a pipe 14 having an adjustable nozzle 15 for introducing cold air into the vessel and directing it onto the contents of the vessel.

In practising my invention, candies, fruit, nuts, and the like, which are to be coated with chocolate, are placed in the vessel and the latter is revolved so as to cause the pieces to roll over each other. Thereafter, melted chocolate is applied to the centers or nuclei slowly and gradually. This may be done by spraying, smearing on with the hand or suitable utensil, or by pouring the chocolate very slowly into the pan. The temperature of the revolving pan should be maintained below that temperature at which the chocolate will harden, before any appreciable mass of chocolate in molten condition can accumulate in the pan. The temperature at which chocolate will harden is approximately 70° Fahrenheit. It will harden more rapidly at lower temperatures, and therefore to obtain satisfactory results under the present process, temperatures well below 70° Fahrenheit should be maintained within the pan.

Ordinarily the temperature in the room in which the process is being carried on will be much higher than is necessary to obtain rapid hardening of the coating, and therefore I provide means for reducing the temperature to the desired point. This means may take a variety of forms, such as a cold-air pipe or a water-jacket for the revolving vessel. However, I prefer to employ cold air, and in the present form of the device the pipe 14 is connected with a suitable source of cold air supply having a temperature of 65° or lower. Such pipe is provided with a suitable controlling valve, and cold air is directed onto the contents of the pan during the time the centers are being coated.

It is desirable in confections of the kind herein referred to, to apply a gloss or glaze to the chocolate-coated pieces.

I find that by using the apparatus herein shown, with means for maintaining a low temperature in the vessel, for applying the glaze, a high degree of gloss can be imparted to the surface. This is done by moistening the chocolate-coated objects with a suitable confectioner's glaze, and then by subjecting the contents of the pan to reduced temperature the glaze quickly dries and does not rub off.

Sometimes I find it desirable to introduce warm air into the revolving pan just prior to applying the glaze, in order to remove excess moisture which may be present after the chocolate coating operation. Any suitable means may be provided for introducing warm air, and in the present arrangement I show a pipe 16 connected with a suitable source of supply, whereby a jet of warm air may be directed into the vessel. Ordinarily this warm air need not be used, except when humid conditions prevail within the vessel, and then only for a brief period of time, just prior to the glazing operation.

Confections made in this manner are not so easily deformed or marred as is the ordinary chocolate-coated product. Usually, chocolate-coated candies must be carefully packed, with each layer protected from the other. However, the candies coated by the present invention can be packed loosely in boxes, pails, and other containers, without danger of becoming scratched or deformed, inasmuch as the chocolate coating, by reason of the rolling and tumbling to which it has been subjected in the revolving pan, becomes compact and hard.

A further advantage of my mode of coating confections is that I can, if desired, produce a rough and irregular chocolate surface, notwithstanding that the center itself may be entirely smooth. Thus, as an example, I have coated pine-nuts so as to leave a rough and irregular surface somewhat resembling the texture of a pine-cone. This is accomplished by using such low temperatures within the vessel that the chocolate will harden on the centers or nuclei before the mass has been tumbled long enough to evenly distribute the chocolate on the centers.

As above pointed out, various forms of devices may be employed for obtaining the desired low temperature within the revolving vessel, and in many instances if the temperature of the room be subject to careful regulation no additional means would be required.

What I claim as new and desire to secure by Letters Patent is:

1. A method of producing chocolate-coated confections which consists of placing the objects to be coated in a revolving vessel, rotating the vessel to cause the objects to roll over each other, applying melted chocolate gradually over said objects, and subjecting the contents of the vessel to a temperature below 70° Fahrenheit, whereby to bring about hardening of the chocolate before a ball or mass forms in the vessel such as would interfere with free rolling of the individual pieces.

2. The method of producing chocolate-coated confections which consists of placing the objects to be coated in a revolving vessel, rotating the vessel to cause the objects to roll over each other, applying melted chocolate gradually over said objects, subjecting the contents of the vessel to a temperature below 70° Fahrenheit, whereby to bring about rapid hardening of the chocolate, and thereafter applying confectioner's glaze over said coated objects, while still maintaining a reduced temperature within the vessel.

3. A method of coating confections, which consists in introducing the centers or nuclei to be coated in a revolving vessel, gradually and slowly applying melted chocolate to the objects to be coated, and simultaneously introducing cold air to said vessel, to bring about a sufficiently rapid hardening of the chocolate to prevent a ball or mass of chocolate from forming in the vessel.

4. A method of producing chocolate-coated confections, which consists in introducing the centers or nuclei to be coated in a revolving vessel, gradually and slowly applying melted chocolate to said objects, and maintaining a temperature within the vessel sufficiently low to cause rapid hardening of the chocolate as it accumulates on the individual pieces.

5. A method of producing chocolate-coated confections, which consists in introducing the centers or nuclei to be coated in a revolving vessel, gradually and slowly applying melted chocolate to said objects, maintaining a temperature within the vessel sufficiently low to cause rapid hardening of the chocolate as it accumulates on the individual pieces, removing excessive moisture from the vessel after the pieces have been coated with chocolate, and thereafter applying a confectioner's glaze to the chocolate-coated pieces and again reducing the temperature within the vessel to insure rapid drying of the glazing material.

JULIUS R. FRANZEN.